United States Patent [19]
Lindsay et al.

[11] 3,763,838
[45] Oct. 9, 1973

[54] CARBURETOR HAVING A HEAT PIPE FOR VAPORIZING FUEL

[75] Inventors: Roger Lindsay, Tattenhall; Alun Thomas, Wirral, both of England; Ian C. Finlay, Glasgow; John L. Wilson, East Kilbridge, both of Scotland

[73] Assignee: Shell Oil Company, New York, N.Y.

[22] Filed: Dec. 23, 1971

[21] Appl. No.: 211,522

[30] Foreign Application Priority Data
Dec. 23, 1970  Great Britain .................. 61,041/70

[52] U.S. Cl. ........ 123/122 AA, 123/122 E, 123/133, 165/32, 165/105
[51] Int. Cl. ........................................... F02m 13/06
[58] Field of Search ................. 123/122 AA, 122 E, 123/133; 165/105, 32

[56] References Cited
UNITED STATES PATENTS

| | | | |
|---|---|---|---|
| 3,273,983 | 9/1966 | Minoza | 123/133 |
| 3,229,759 | 1/1966 | Grover | 165/105 |
| 2,240,311 | 4/1941 | Mills | 123/122 AA |
| 2,472,717 | 6/1949 | Morey | 165/105 |
| 2,766,974 | 10/1956 | McConnell | 165/105 |
| 3,150,651 | 9/1964 | Buchner et al. | 123/122 E |
| 3,332,476 | 7/1967 | McDougal | 165/105 |
| 3,253,647 | 5/1966 | Deshaies | 123/122 E |

*Primary Examiner*—C. J. Husar
*Attorney*—Theodore E. Bieber et al.

[57] ABSTRACT

A fuel vaporizing system for spark ignition internal combustion engines wherein a heat pipe filled with a narrow-range boiling point fluid is disposed to transfer heat from a heat zone to a vaporizing zone. The liquid fuel is vaporized in the vaporizing zone prior to being mixed with air.

14 Claims, 13 Drawing Figures

PATENTED OCT 9 1973  3,763,838

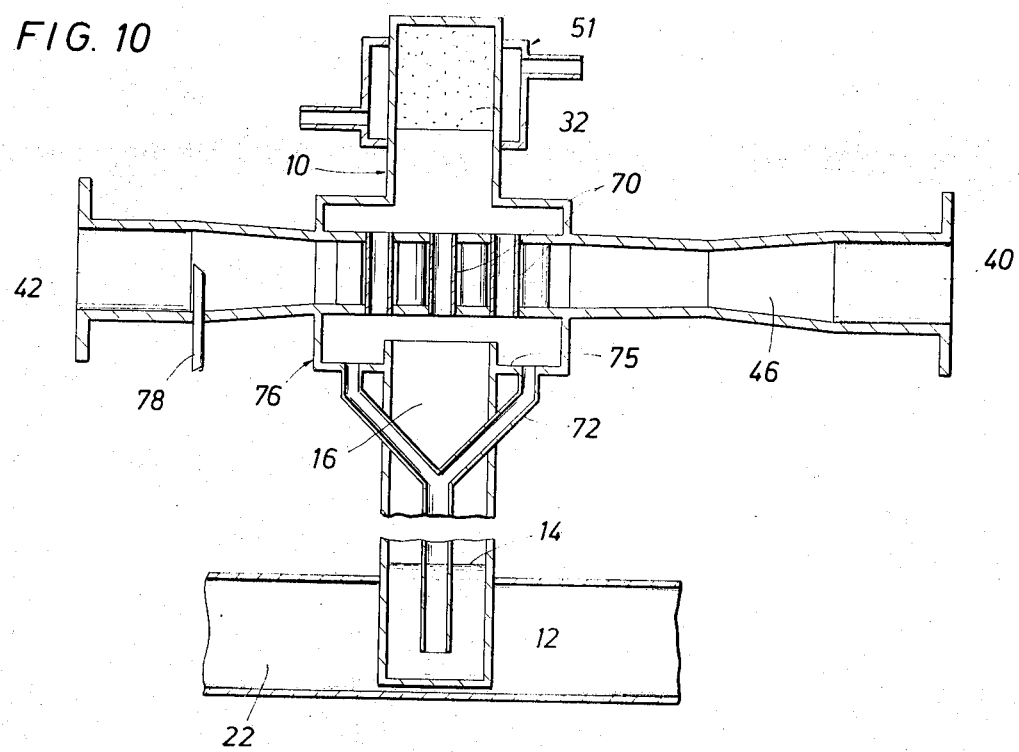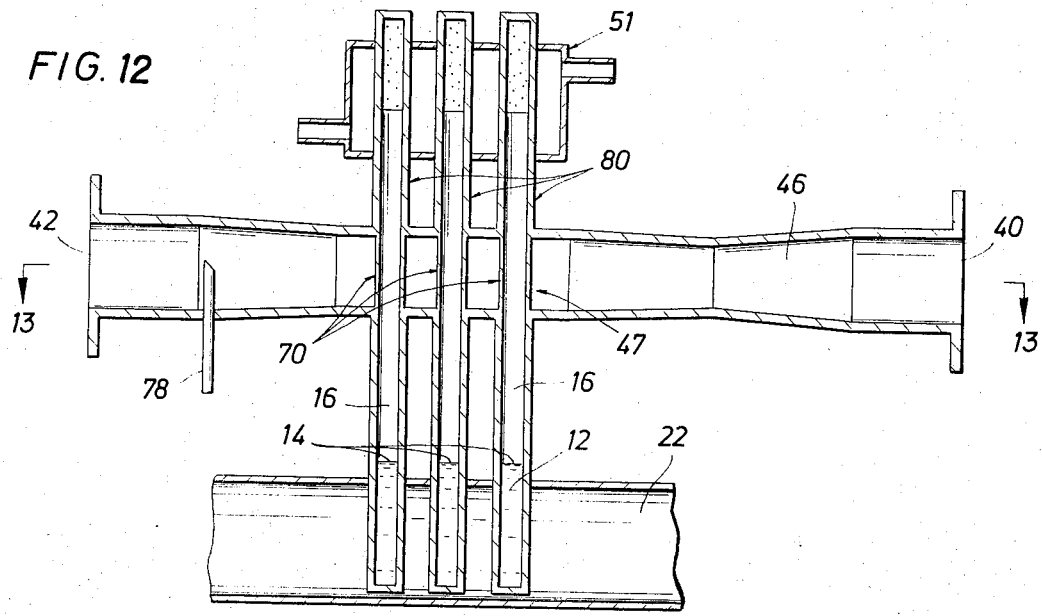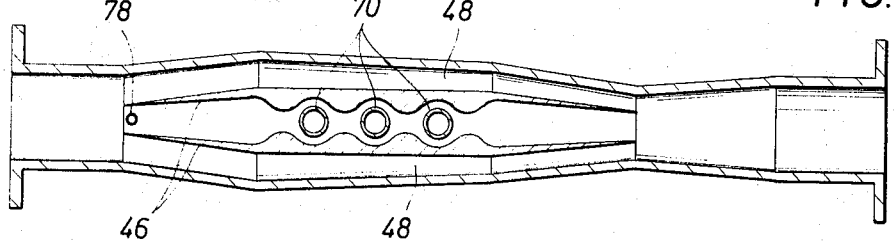

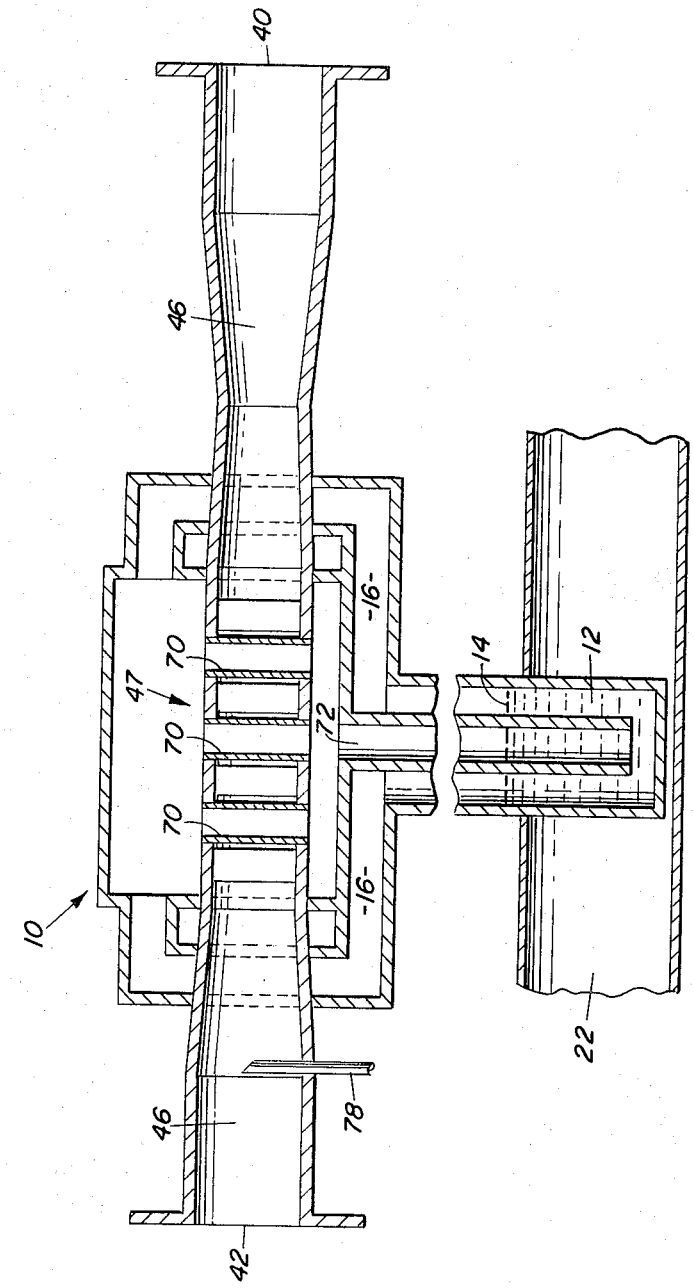

CARBURETOR HAVING A HEAT PIPE FOR VAPORIZING FUEL

BACKGROUND OF THE INVENTION

This invention relates to a fuel vaporizing device for use with a spark-ignition internal combustion engine.

The conventional spark-ignition relies on a carburetor to mix a desired proportion of a volatile fuel with the inlet air. For complete combustion of the fuel-air mixture the fuel needs to be uniformly dispersed in the air. Such a uniform mixture is seldom if ever obtained in practice with a conventional carburetor. Manifold fuel injection offers only marginal improvement over the results obtained with carburetors.

SUMMARY OF THE INVENTION

The invention seeks to enable a more uniform fuel-air mixture to be obtained.

This is achieved in accordance with the invention by completely vaporizing the fuel by boiling an intermediate heat transfer liquid having a narrow range boiling point and enclosed in a sealed container and using the latent heat of condensation of its vapor to vaporize substantially the entire fuel charge prior to its admixture with the combustion air. Evaporation of the fuel thus takes place at a substantially constant temperature irrespective of the rate at which it is demanded.

When the fuel vapor is mixed with the main stream of combustion air which is relatively cool the vapor may condense into very small droplets, in the form of an aerosol, which not only tend to disperse very rapidly to produce a uniform fuel-air mixture, but also resist any tendency to accumulate liquid on surfaces that it may encounter, e.g., on the walls of the inlet manifold.

During normal operation, the heat to boil the liquid is conveniently drawn from the exhaust gases.

A fuel-vaporizing device in accordance with the invention includes one or more heat pipes (as specified below) each of which is in the form of a sealed vessel containing a heat transfer fluid so constructed that in operation the liquid phase of the fluid is arranged to collect in a heat receiving zone and the vapour phase or the fluid is arranged to condense in a heat discharging zone, so that the latent heat of vaporization of the heat transfer fluid is used to vaporize liquid fuel upstream of the point at which it is to be mixed with the main stream of combustion air.

The term "heat pipe" as used in this specification is intended to include devices known as "two-phase thermosyphons." This latter term is derived from the presence of both liquid and vapour phases in the device. The geometry of the heat pipe is is no way limited to a circular or tubular configuration.

The use of one or more heat pipes enables heat to be supplied to the fuel within a restricted temperature range virtually regardless of the rate at which the fuel is demanded. Furthermore, at startup the heat pipe or pipes reach their operating temperature very much more quickly than a solid heat conductor.

The vaporizing device may be used in conjunction with a suitably modified conventional carburetor, or, better still, with a fuel injection system.

The heat-receiving zone of each heat pipe is conveniently arranged to receive heat from the exhaust gases. An auxiliary heat source may be provided for use during cold startups.

As the heat demanded from the heat pipe may vary considerably, surplus heat may be removed by conventional cooling means.

The inclusion of a non-condensable gas in each heat pipe can be arranged to act as a buffer in order to regulate the cooling of the heat transfer fluid.

In operation, the non-condensable gas will be driven to a relatively cool part of the vessel by the vapor pressure of the heat transfer fluid and progressively compressed as the heat contained in the heat pipe increases in excess of requirements. The properties of the vapor rising in the tube past the level of the cooling zone will determine the loss of surplus heat and thus prevent overheating.

The invention will now be further described by way of example with reference to the accompanying drawings in which:

FIG. 10 is a vertical section of a modified form of the invention shown in FIGS. 7 and 8;

FIG. 11 is a vertical section of a second modified form of the invention shown in FIGS. 7 and 8;

FIG. 12 is a vertical section of a second practical embodiment of the invention; and FIG. 13 is a horizontal section of the embodiment shown in FIG. 11.

Figure 1:
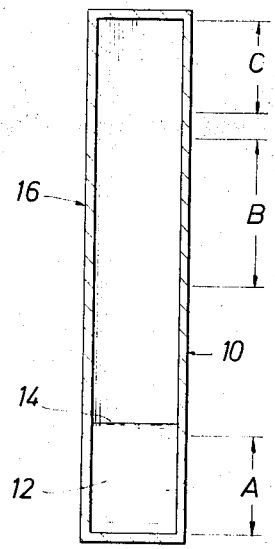
FIG. 1 is a diagrammatic sectional side elevation of a heat pipe.

The heat pipe in FIG. 1 comprises a sealed vessel 10 containing a small quantity of a heat transfer liquid 12 which has a narrow-range boiling point. The space above the surface 14 of the liquid 12 is occupied by its vapor 16.

In operation, the heat pipe receives heat in the zone marked A, which causes the liquid 12 to boil. The resulting vapor passes up the pipe and condenses on cooler surfaces, thereby heating them virtually to the boiling point of the liquid. Heat is thus available at a heat transfer zone B at a substantially constant temperature. When heat is removed, it causes a proportion of the vapor 16 to condense and to collect in the heat receiving zone A. When more heat is being supplied at A than is required at B, the vapor rises further up the container 10 into a cooling zone C where the vapor is condensed by external cooling means.

The heat pipe in FIG. 1 relies on gravity to return the condensate to the heat receiving zone A, which restricts its use to situations in which this will occur.

Figure 2:
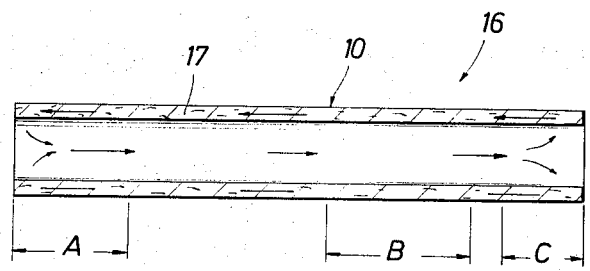
FIG. 2 is a diagrammatic sectional side elevation of a heat pipe containing a wick.

An embodiment of a heat pipe which does not rely on gravity to return the liquid to the zone A is shown in FIG. 2. The heat pipe which in all other respects may be similar to that shown in FIG. 1 or 3 is provided with a wick-like lining 17 on its inner walls.

In operation the liquid 12 is evaporated in zone A by the heat supplied to the heat pipe, and the capillary of the liquid in the wick draws fresh liquid into the evaporating zone A. The vapor 16 is caused to circulate in the direction indicated by the cooling in the zone B, which causes contraction in the volume of the vapor and condensation into the wick.

Figure 3:
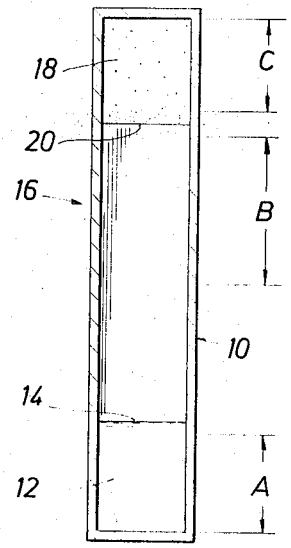
FIG. 3 is similar to FIG. 1 in all respects except that it additionally contains a quantity of non-condensable gas.
Figure 4:
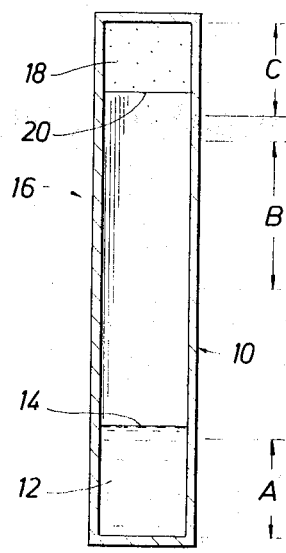
FIG. 4 is similar to FIG. 3, but differs in its operating condition.

In the embodiment of the heat pipe shown in FIG. 3, a small quantity of non-condensable gas 18 is introduced into the space above the liquid surface 14. This gas is progressively forced to the cooler zone C of the heat pipe as the temperature of the heat pipe increases. This is caused by the flux of vapor from the lower part of the container to the cooler upper part in which the vapor tends to condense. The result is that there is effectively an interface at 20 between the vapor 16 and the gas 18, caused by the temperature variation along the heat pipe. If the flux of vapor exceeds that needed to satisfy the thermal demands of zone B, it tends to cause the interface 20 to lift to expose a greater part of the cooling zone C to the vapor 16 (as shown in FIG. 4). In this way the rate of removal of surplus heat from the heat pipe is effectively regulated. In either embodiment, should a sudden increase in heat demand occur, the more rapid condensation of the vapor 16 causes a drop in total pressure inside the vessel 10 so that the liquid boils more quickly to restore equilibrium.

In the embodiment of FIG. 3 the interface 20 will similarly move down the tube.

Although the heat pipes shown are tubular, their exact geometry will be determined by consideration of their required thermal characteristics and their working environment.

Figure 5:
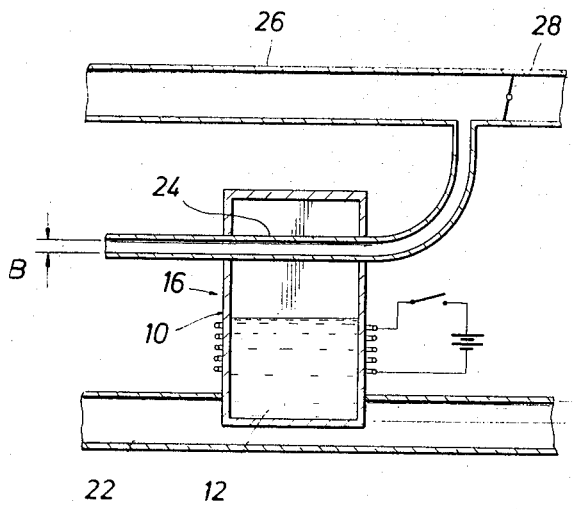
FIG. 5 is a diagrammatic sectional side elevation of a vaporizing device in accordance with the invention.

The fuel vaporizing device shown in FIG. 5 comprises a heat pipe 10 whose heat receivng zone A is arranged to receive heat from exhaust gases in an exhaust passage 22.

A fuel line 24 is disposed in the heat transfer zone B of the heat pipe to receive sufficient heat, at constant temperature, to insure that all the fuel is vaporized prior to its admixture with the main stream of combustion air in the inlet manifold 26. On mixing with the relatively cold main air stream the vaporized fuel may condense to form a mist or aerosol of fine droplets whose diameter may be as small as 1.0 $\mu$.

The necessary fuel metering equipment is not shown, but it must be capable of delivering an appropriate quantity of fuel depending on such factors as engine speed and load and the position of the butterfly valve 28 in the inlet manifold.

Figure 6:
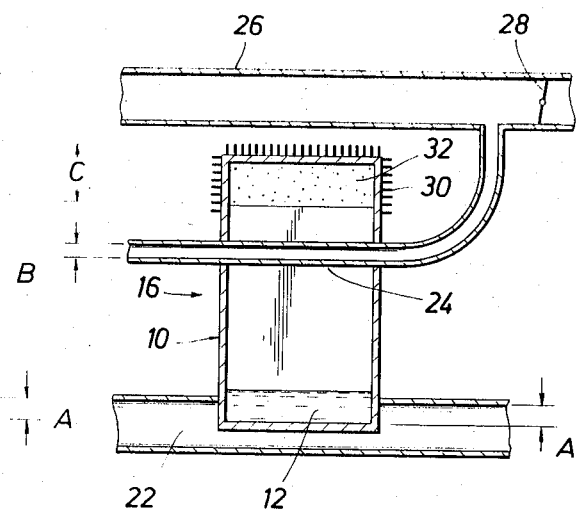
FIG. 6 is similar to FIG. 5 except that the heat pipe additionally contains a quantity of non-condensable gas.

FIG. 6 is similar to FIG. 5, save that the heat pipe 10 has been "stabilized" by the provision of cooling means 30 at its upper end. The vapor 16 of the heat transfer fluid is normally kept out of contact with this part of the heat pipe by a small quantity of non-condensable gas 32 which behaves in the way described with reference to FIG. 3.

Figure 7:
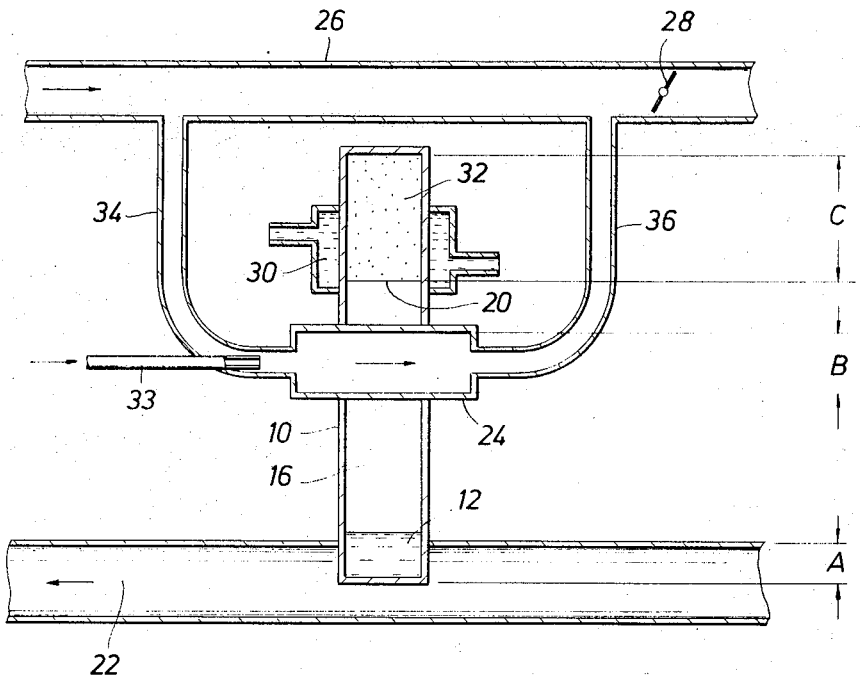
FIG. 7 is a modified form of the invention.

FIG. 7 differs from FIG. 6 only in that the fuel is vaporized in the heat transfer region B in the presence of a small quantity of air bled from the main stream of combustion air through a by-pass passage 34. The fuel vapor and air mixture are returned to the main stream of combustion air via a passage 36, The advantage of this construction is that the fuel vapor-air mixture may mix with the main stream more quickly. The proportion of air bled through the passages 34, 36 should not be so high that any significant deterioration of volumetric efficienty results through the increase in inlet air temperature.

Figure 8:
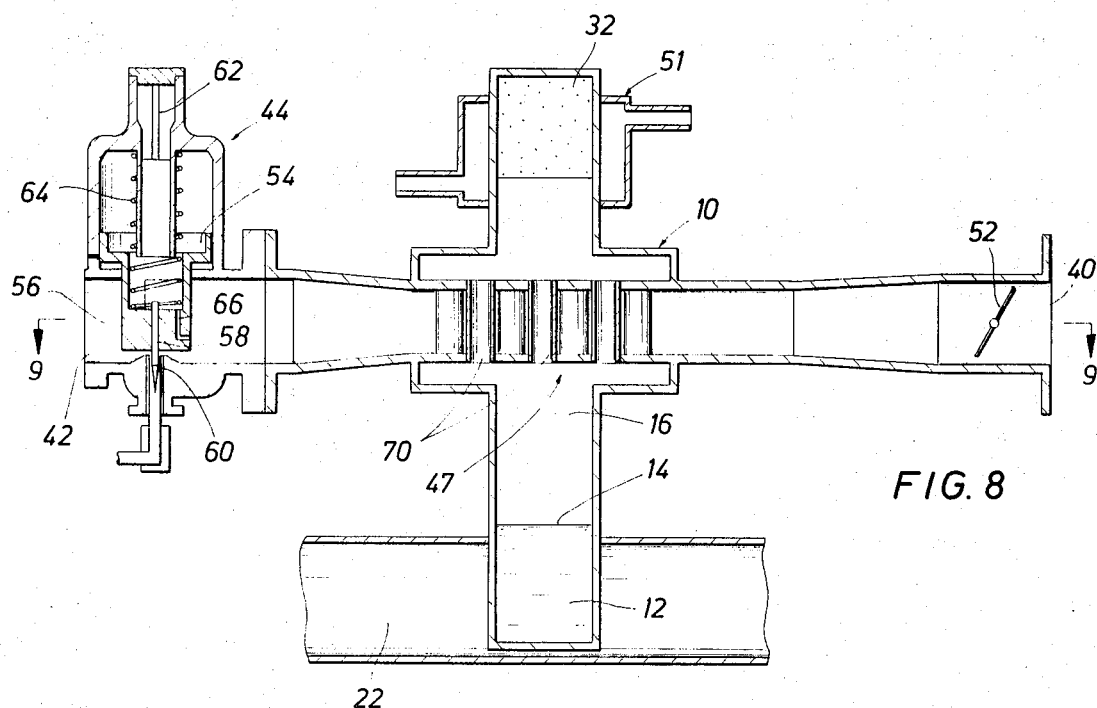
FIG. 8 is a vertical section of a practical embodiment of the invention.
Figure 9:
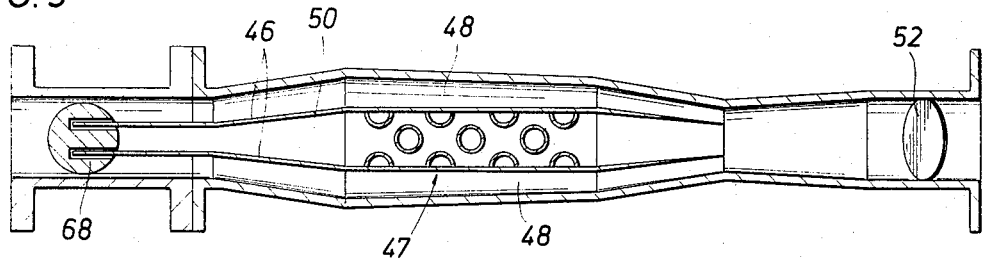
FIG. 9 is a horizontal section of the embodiment shown in FIG. 7.

A practical embodiment of a vaporizing device is shown in FIGS. 8 and 9. The right-hand end 40 of the device as shown is intended for connection to the engine inlet port so that the flow of air is in a left-to-right direction. On entering the left-hand end 42 of the device it passes through a conventional, though modified, carburetor 44. The air stream is then divided into a primary and secondardy stream, the latter containing an over-rich mixture of fuel droplets with air, while the former comprises only air. After vaporization of the fuel in the secondary stream, the two streams are reconbined.

The primary and secondary streams are segregated by a pair of longitudinal partitions 46 extending from upstream (i.e., to the left) of the point at which fuel enters through the carburetor to a remixing point downstream of the heat transfer zone 47 of the vaporizing device. The primary stream passes along the outer duct 48 which consists of a venturi which is formed by contraction and expansion of the corss-sectional area, while the secondary stream passes along the central duct 50.

The operation of the carburetor 44 is well known, and forms no part of the invention as it serves simply as one of many ways of supplying a metered fuel charge to the engine inlet air. The most notable modification is that the butterfly valve 52 is placed downstream of the vaporizing device. Otherwise the carburetor operates normally; that is to say, the piston 54 is lifted by the vacuum downstream of the carburetor, causing both the throttle valve 56 to lift, and simultaneously tapered needle 58 which regulates the area of the fuel orifice 60, Fuel is drawn from the orifice 60 by the vacuum. Control of the response of the piston 54 is effectived by a damper 62, a spring 64 and the size of the orifice 66 communicating the upper side of the piston with the downstream side of the valve 56. In order to accommodate the partitions 46, slots 68 are milled in the throttle valve 56.

The heat transfer zone 47 of the device comprises a number of upright tubular sections 70 extending through the central duct 50. These sections 70 correspond to the zone marked "B" in the previous Figures. The heat-receiving portion of the heat pipe 10 projects into the engine exhaust manifold 22 and is filled with liquid 12. Water-cooling means 51 provided at the upper end of the heat pipe. During normal operation of the device, the extent to which the vapor 16 comes into contact with the cooling means 51 is determined by means of a non-condensing gas at 32 as already described.

The carburetor can be replaced by a suitable fuel injection system without the need for any major change in the configuration of the vaporizing device.

In order to keep the quantity of fuel residing at any one instant of time on the evaporator surfaces during the process of evaporation, it is necessary that a small surface area is used for evaporation, and this should not exceed 200 cm$^2$ for each gram of hydrocarbon fuel to be evaporated per second. The air velocity across the evaporator surfaces at full throttle should be maintained at a velocity of at least 25 ms$^{-1}$, thereby improving the rate of evaporation of the fuel. The process is assisted by introducing the liquid fuel into the evaporating device in the form of droplets, and the unevaporated liquid passes from surface to surface as a liquid spray carried in the air stream. This "mist flow" substantially improves the heat transfer rate from the metal surface to the liquid film.

As a consequence of the required air velocity, the pressure drop in the secondary duct cannot be neglected. Only a proportion of the total air flow passes over the heated tubes in the secondary duct, the remainder flowing through the primary ducts. The primary ducts are formed in the following manner to reduce the pressure loss through the evaporating device. The primary ducts are in the form of a venturi. The convergent part increases the air velocity and thereby decreases its static pressure. At the minimum cross section and, therefore, the minimum pressure, the secondary duct is recombined with the primary ducts. This low pressure induces the flow through the secondary duct. The recombined duct is made divergent reducing the gas velocity and thus raising the pressure. The overall pressure drop across the evaporating device is, thereofore, less than the pressure drop across the evaporating tubes alone. The position of the partitions 46 dividing the inlet flow into the primary and secondary streams is such that the relative areas of the ducts are in the proportions selected for the primary and secondary flows. The minimum area of the primary ducts in arranged to provide the pressure drop calculated to be required by the secondary air flowing across the evaporator tubes. This ensures an equal velocity of each air stream at the separation of the flows, giving a negligible distrubance to the flow.

It is preferable but not essential that the fuel is metered into the secondary duct at a flow rate that compensates for the changing quantity of liquid fuel residing on the evaporating surface, thus providing a constant air/fuel ratio at all times. This can be achieved by one of several methods.

The first method is substantially a modification of a piston-controlled carburetor wherein the needle valve that meters the fuel is carried by a piston whose position is controlled by the air velocity. A delay is provided in the motion of this needle valve such that a temporary increase or decrease in the fuel supply compensates for the changing fuel on the evaporating surfaces. This delay may be obtained by the inertia of the mass of the piston or damping mechanism.

In the second method a transducer measures the air flow rate and produces an electrical signal. An electrical circuit modifies this signal in such a manner that when it is used to actuate a fuel-metering valve, a fuel flow is produced which compensates for the fuel residing on the evaporating surfaces, for the temperatures of various parts of the engine and the liquid fuel, and also for the air temperature and pressure.

In a third method, the quantity of air, as well as the quantity of fuel, is to be metered to the engine in such a manner that the air-flow remains constant, and in a quantity so called for by the position of the accelerator pedal.

The device may also be modified as shown in FIG. 10, in which it incorporates a liquid return pipe 72 extending below the level 14 of the liquid in the heat-receiving position. The lower part 74 of the heat pipe then extends above the floor 76 of the central part 76 of the heat pipe in order to provide a head which will insure that the condensate will drain to the heat-receiving zone without it being interfered with by the rising vapor in the heat pipe. A fuel injection nozzle 78 is shown in place of the carburetor in FIGS. 8 and 9.

Another method of improving the circulation of the vapor and the condensate so that there is no counter-flow present is to introduce the vapor into the upper part of the central part 76 of the heat pipe. This is shown in FIG. 11. In this case the cooling means 51 is dispensed with.

FIGS. 12 and 13 show a form in which the mechanical construction of the device has been simplified, and several discrete heat pipes 80 are employed. This construction has the advantage that it will still operate in the event of a failure of one of the heat pipes. It may also be possible to modify existing automobiles by employing a simplified system of this kind.

Under operating conditions the liquid phase in the heat pipe should not occupy more than 40 percent of the total internal volume of the heat pipe, the remainder of the internal volume being occupied by the vapor phase and the non-condensable gas when used. In liquid form the heat pipe fluid may be a pure substance or mixture such that the freezing temperature lies between 0°C and −100°C and the boiling temperature at atmospheric pressure between 100°C and 300°C. It is to be chemically stable and non-corrosive to the materials of construction used at the operation temperature of the thermosyphon or heat pipe and appreciable chemical decomposition or reaction should not occur within a period of several years when within the thermosyphon or heat pipe. Examples of a suitable fluid are 2-octanol, decane and tetralin.

In order to obtain a high heat flux in the heat pipe, it is advantageous for the vapor of the heat transfer fluid to be as dense as possible. This tends to imply a high operating pressure in the heat pipe, but in order to avoid a very heavy construction this should be kept to between 1 and 4 atmospheres under normal conditions.

The non-condensable gas, if present, should be gaseous at the operating pressure and chemically non-reactive within the thermosyphon or heat pipe. Examples are nitrogen, helium, argon, neon and krypton.

In place of the stabilizing method proposed for the heat pipe, namely, using a non-condensable gas, it will be appreciated that instead of regulating the heat loss from the heat pipe, the heat supplied to the heat pipe can be controlled by mechanical or electrical means, operating in response to, say, the pressure in the heat pipe. An electrical method is naturally to be preferred in the case where electrical energy is used to heat the heat pipe.

The choice of a suitable heat transfer fluid is important; it will depend upon the characteristics of the fuel to be employed and, in particular, the final boiling point (FBP) of the latter. The boiling point of the heat transfer fluid should be higher than the FBP of the fuel, but not so high that it causes deterioration of the fuel, such as by cracking, to occur. For example, for a typical gasoline whose FBP is 190°C, the operating temperature of the heat pipe should not be lower than 200°C, nor higher than 300°C. The quantity of non-condensable gas within the heat pipe will have a considerable effect on the stable operating temperature of the heat pipe and should thus be carefully controlled in manufacture.

The construction of the heat pipe must also take into account the maximum and minimum fuel vaporizing requirements, and have sufficient cooling so that at no time is all of the heat transfer liquid 12 allowed to vaporize. Alternatively, however, complete evaporation of the liquid 12 can be utilized to limit the maximum heat flux, which can be conveyed.

The use of the vaporizing device in accordance with the invention enables a gasoline engine to be run on such lead mixtures, in excess of 20:1 air-fuel ratio, that the levels of carbon monoxide and oxides of nitrogen are simultaneously very low.

The capability of burning fuel at ultra lean mixtures also permits fuel having a lower octane number to be used with the same compression ratio. This is particularly important in that at the present time refining techniques in use cannot produce a lead-free fuel having the same high octane ratings as the leaded premium grades.

In the gas turbine, the vaporizing device is used for vaporizing fuel prior to its mixture with air in the primary combustion zone. It is also used to inject vaporized fuel into oxygen-rich gases, in an inter-stage turbine reheat system in a power-reducing engine, or in an exhaust reheat system in a jet propulsion or vertical lift jet engine.

It is contemplated that it may be desirable to provide electric or other heating means 18 in FIG. 1 for startup conditions before the exhaust gases can provide the necessary heat. This starting-up heat could be supplied to the fuel via an auxiliary heat pipe or pipes.

The use of the vaporizing device in accordance with the invention enables a gasoline engine to be run on such lean mixtures, in excess of 20:1 air-fuel ratio, that the levels of carbon monoxide and oxides of nitrogen are simultaneously very low.

We claim as our invention:

1. A liquid fuel vaporizing device for a spark ignition engine comprising:
   at least one heat pipe, said heat pipe being in the form of a sealed vessel;
   a narrow-range boiling point heat transfer fluid, said fluid being disposed in said sealed vessel;
   said heat pipe being disposed so that the liquid phase of the fluid collects in a heat-receiving zone, the vapor phase of the fluid being arranged to condense in a heat transfer zone where heat is required to vaporize liquid fuel upstream of the point where the fuel is mixed with the main stream of combustion air for said engine;
   the heat-receiving portion of said heat pipe being disposed to extend into the exhaust manifold of the engine with the outer surface of said sealed vessel in contact with the exhaust gas of the engine; and
   a fuel conduit disposed in heat transfer relationship with the heat transfer zone of the heat pipe.

2. A device as claimed in claim 1, in which the heat pipe is provided with additional cooling means which are arranged to remove heat from the vapor phase of the heat transfer fluid.

3. A device as claimed in claim 1 in which the inner surface of the heat pipe is lined with a wick-like structure for transporting the heat transfer fluid when in the liquid phase of capillary action.

4. The device of claim 1 in which the heat pipe contains a quantity of gas which is non-condensable within the intended range of operation of the heat pipe.

5. The device of claim 1 in which the heat pipe is formed by a plurality of individual pipes.

6. The device of claim 1 and in addition a secondary air duct communicating with said fuel conduit so that the fuel can be vaporized in the presence of a secondary stream of air prior to said fuel mixing with said mainstream of combustion air.

7. The device of claim 6, and in addition a main air duct for supplying the mainstream of combustion air, said main air duct converging until it combines with said secondary air duct whereafter said combined main and secondary air ducts diverge.

8. The device of claim 1 wherein the liquid phase present in the heat pipe occupies less than 40 percent of the total volume of the last pipe.

9. The device of claim 1 in which the heat transfer fluid has a boiling point of between 100°C and 300°C.

10. The device of claim 9 in which the heat transfer fluid is 2-octanol.

11. The device of claim 9 in which the heat transfer fluid is decane.

12. The device of claim 9 in which the heat transfer fluid is tetralin.

13. The device of claim 1 and in addition a return passageway formed in said heat pipe for returning condensate form said heat transfer zone to said liquid zone.

14. A method for vaporizing the liquid fuel supplied to a spark-ignition internal combustion engine comprising:
   boiling an intermediate fluid enclosed in a sealed container in a high temperature region;
   using the latent heat of condensation of the vapor of said fluid to vaporize a fuel charge for the engine prior to its admixture with the mainstream of combustion air, and
   admixing said vaporized fuel and the mainstream of combustion air.

* * * * *

PO-1050
(5/69)

UNITED STATES PATENT OFFICE
CERTIFICATE OF CORRECTION

Patent No. 3,763,838            Dated October 9, 1973

Inventor(s) Roger Lindsay, Alun Thomas, Ian C. Finley and John L. Wilson

It is certified that error appears in the above-identified patent and that said Letters Patent are hereby corrected as shown below:

In column 2, line 36, "Figure 7" should read -- Figure 8 --.

In column 2, line 44, "Figure 11" should read -- Figure 12 --.

Signed and sealed this 5th day of November 1974.

(SEAL)
Attest:

McCOY M. GIBSON JR.            C. MARSHALL DANN
Attesting Officer              Commissioner of Patents